United States Patent [19]

Taylor

[11] Patent Number: 5,901,100
[45] Date of Patent: May 4, 1999

[54] FIRST-IN, FIRST-OUT INTEGRATED CIRCUIT MEMORY DEVICE UTILIZING A DYNAMIC RANDOM ACCESS MEMORY ARRAY FOR DATA STORAGE IMPLEMENTED IN CONJUNCTION WITH AN ASSOCIATED STATIC RANDOM ACCESS MEMORY CACHE

[75] Inventor: Craig Taylor, Colorado Springs, Colo.

[73] Assignee: Ramtron International Corporation, Colorado Springs, Colo.

[21] Appl. No.: 08/840,118

[22] Filed: Apr. 1, 1997

[51] Int. Cl.$^6$ ............................................. G11C 7/00
[52] U.S. Cl. ......................... 365/219; 365/220; 365/221
[58] Field of Search ...................... 365/189.04, 230.05, 365/219, 220, 221

[56] References Cited

U.S. PATENT DOCUMENTS

| | | | |
|---|---|---|---|
| 4,882,710 | 11/1989 | Hashimoto | 365/189.05 |
| 5,029,141 | 7/1991 | Yoshimoto | 365/230.03 |
| 5,570,040 | 10/1996 | Lytle | 326/41 |
| 5,701,267 | 12/1997 | Masuda | 365/201 |

*Primary Examiner*—Son Mai
*Attorney, Agent, or Firm*—William J. Kubida, Esq.; Holland & Hart LLP

[57] ABSTRACT

An integrated circuit first-in, first-out ("FIFO") memory device comprises an input bus for receiving data, an input buffer coupled to the input bus for storing the data and at least one dynamic random access memory ("DRAM") array coupled to the input buffer. A write pointer is operative for storing the data in the input buffer to a location within the memory array indicated and an output bus is coupled to the memory array and a read pointer for providing previously written data from the memory array at a location indicated by the read pointer. In a preferred embodiment, the FIFO further comprises at least one static random access memory ("SRAM") cache interposed between the input and output buses and the memory array having a width corresponding to each row of the memory array.

36 Claims, 12 Drawing Sheets

FIRST-IN, FIRST-OUT INTEGRATED CIRCUIT MEMORY DEVICE UTILIZING A DYNAMIC RANDOM ACCESS MEMORY ARRAY FOR DATA STORAGE IMPLEMENTED IN CONJUNCTION WITH AN ASSOCIATED STATIC RANDOM ACCESS MEMORY CACHE

CROSS REFERENCE TO RELATED PATENT APPLICATIONS

The present invention is related to the subject matter of U.S. patent applications Ser. Nos. 08/319,289 filed Oct. 6, 1994 and 08/460,665 filed Jun. 2, 1995, both assigned to Enhanced Memory Systems, Inc., a subsidiary of Ramtron International Corporation, Colorado Springs, Colo., assignee of the present invention, the disclosures of which are herein specifically incorporated by this reference.

BACKGROUND OF THE INVENTION

The present invention relates, in general, to a synchronous first-in, first-out ("FIFO") integrated circuit ("IC") memory device. More particularly, the present invention relates to a FIFO memory device utilizing a dynamic random access memory ("DRAM") memory array implemented in conjunction with enhanced dynamic random access memory technology ("EDRAM®" is a trademark of Enhanced Memory Systems, Inc.) in lieu of a conventional static random access memory ("SRAM") based memory array.

FIFOs are integrated circuit ("IC") devices which integrate a memory array, such as dual-ported SRAM memory array, with associated on-chip logic which may be utilized in a wide variety of data buffering applications such as graphics, disk controllers and communication networks. Despite requiring up to six transistors per memory cell as opposed to a single transistor and capacitor, SRAM memory has nevertheless been used in these applications due to its significant speed advantage over conventional dynamic random access memory ("DRAM") due to the latter's inherent delays in bit line precharge, memory cell refresh, row access times and the like.

A FIFO memory's function allows quick write and read bursts to minimize the time spent by a central processing unit ("CPU") when communicating with slower circuit elements thereby allowing the highest performance on the computer bus. FIFO's may also be used to enhance the throughput of time-critical systems developed for digital signal processing ("DSP"). Typical applications may involve allowing high speed throughput between DSP's in pipelined and parallel applications, supporting communications between a DSP and a host processor and buffering data between mismatched processor speeds and the buses. Typically, FIFO buffer memories allow the matching of multiple asynchronous systems whereby one system is operating at a significantly different clock frequency than another in order that data from one system may be temporarily stored before being read out for processing. Characteristically, the length of the FIFO is determined by the difference in clock rates and the amount of data to be buffered. When utilizing dual-ported SRAM, conventional FIFOs allow simultaneous access to the memory through two independent "write" and "read" ports. Since the data is always contiguous, an address bus is not needed and data is read out in the same order in which it was received.

In a synchronous FIFO, data may be clocked into and out of registers which buffer the actual memory array, so that shorter data setup and hold times are possible than with asynchronous FIFOs. Synchronous FIFOs also provide easier integration into synchronous systems. Writing and reading operations are controlled by "write" and "read" enables, while the "write" and "read" clocks may have either the same or different frequencies or have differing phase relationships.

In conventional FIFO design, four "flags" are provided to give the user information on the status of the memory array. In dual-ported RAM arrays, dedicated write and read address pointers are utilized, and the flag logic prevents illogical writes and reads from occurring. The "empty" flag indicates that the read and write cycle counts are equal, and will be automatically asserted after a reset, which functions to reset the cycle counters and returns both read and write pointers to memory address zero. The empty flag, therefore, prevents reading while empty, a data underflow condition. As a result, if the memory array is empty, a read cycle is inhibited until at least one data entry has been written.

On the other hand, a "full" flag indicates that the write and read counts are at a maximum distance apart, which implies that a full load of data has been written to the FIFO and has not yet been read out. The full flag, therefore, prevents writing while full, a data overflow condition. If the memory array is full, a write cycle is inhibited until at least one data entry has been read out. Once data that has been stored at a given address is read, it can then be overwritten. In such conventional FIFO operation, as long as the read pointer is advancing due to read cycles, the write pointer will "wrap around," continuing past the last memory address and beginning again at the first memory address until the difference between the write and read counters indicate that the FIFO is full. Therefore, the flag status of the FIFO is a function of the difference between the pointers and not their absolute value. Resetting the FIFO simply initializes the address pointers to address zero.

The other pair of "flags" are conventionally known as programmable "almost empty" and programmable "almost full" flags which are user programmable to provide a preset offset before the empty and full conditions are reached to provide early warning to the user of approaching states of fullness or emptiness. In conventional FIFOs, multiple write enables and read enables are provided to be utilized at reset times to configure the FIFO for programmable flags.

To enable high speed device operation, conventional FIFOs have utilized SRAM memory arrays which are capable of reading and writing data more quickly than DRAM memory due, in part, to the fact that DRAM memory must be periodically refreshed, the bit lines precharged and the like. However, SRAM memory cells generally comprise four or even six transistors per memory cell as opposed to the single transistor and capacitor of the typical DRAM memory cell. As a consequence, SRAM memory cannot be as densely integrated as DRAM memory and is, therefore, more space consuming in terms of on-chip die area required to fabricate a comparable size memory array and consequently more costly to produce.

SUMMARY OF THE INVENTION

The EDRAM integrated circuit memory device architecture disclosed in the aforementioned United States Patent Applications is designed to minimize delays associated with row access, precharge and refresh operations of a conventional DRAM memory array. Essentially, this is accomplished through the integration of a small, row SRAM cache associated with the DRAM memory which allows reads to the device to be made only from the SRAM cache and, therefore, to be allowed to occur during refresh and precharge cycles of the DRAM array. Moreover, the SRAM cache and DRAM array are sufficiently decoupled so that writes to the device can occur to the DRAM (with a write-through to the SRAM if a cache "hit" occurs) and reads and writes to the device can occur simultaneously. As a consequence, utilizing EDRAM memory device technology, significantly larger DRAM memory arrays can be substituted for conventional SRAM memory arrays in FIFO memory devices yet provide substantially equal performance at lower cost.

Particular disclosed herein is an integrated circuit FIFO memory device which comprises an input bus for receiving data, an input buffer coupled to the input bus for storing the data and at least one DRAM array coupled to the input buffer. A write pointer is operative for storing the data in the input buffer to a location within the memory array indicated and an output bus is coupled to the memory array and a read pointer for providing previously written data from the memory array at a location indicated by the read pointer. In a preferred embodiment, the FIFO further comprises at least one SRAM cache interposed between the input and output buses and the memory array having a width corresponding to each row of the memory array.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
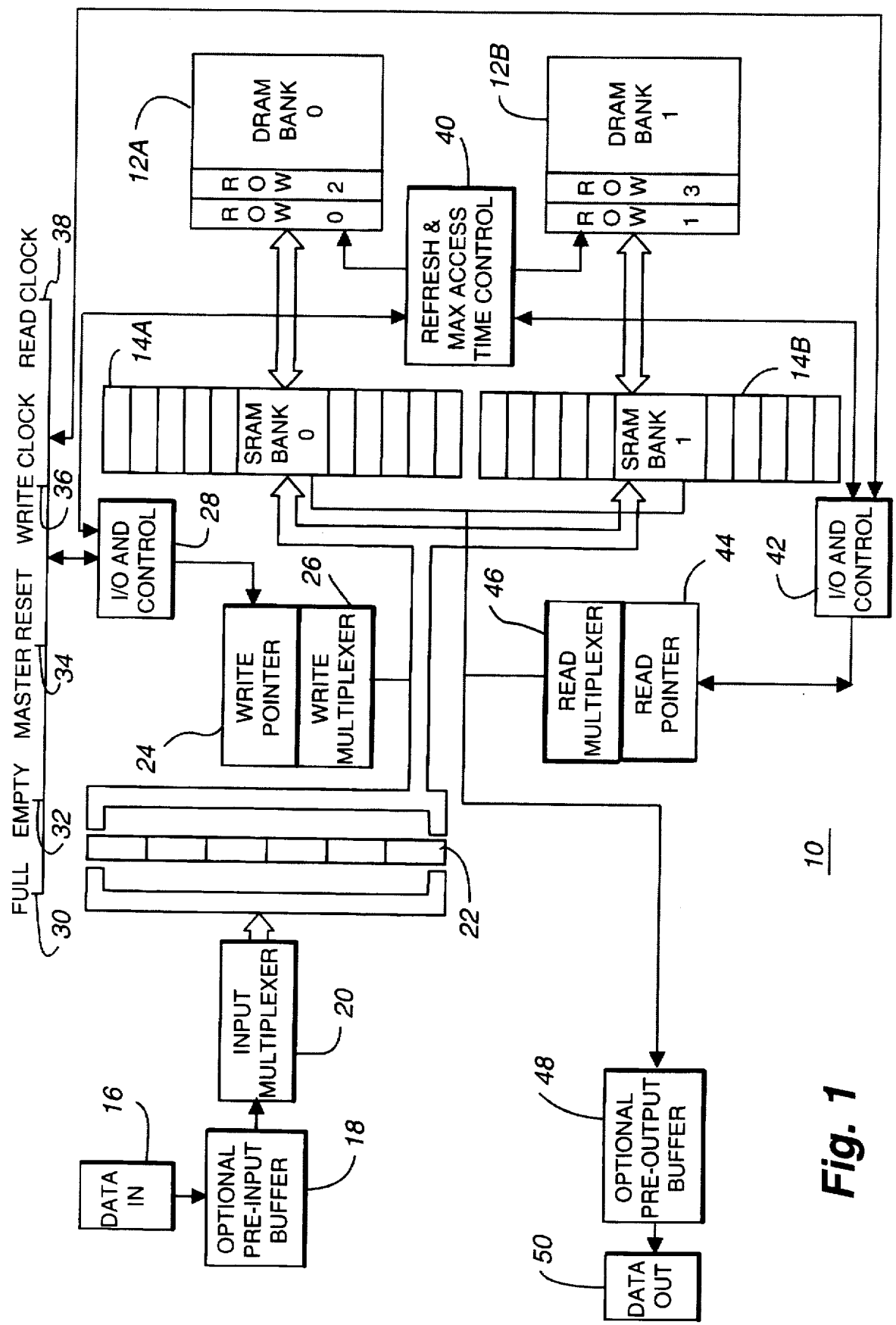
FIG. 1 is a representative functional block diagram of a FIFO memory device in accordance with the present invention utilizing, for example, multiple DRAM banks as a primary memory array in lieu of conventional SRAM based architectures.

With referenced now to FIG. 1, a first-in, first-out ("FIFO") memory device 10 is shown. The memory device 10 comprises, in pertinent part, a primary DRAM memory array comprising DRAM bank 0 (12A) and DRAM bank 1 (12B). An SRAM cache comprising SRAM bank 0 (14A) and SRAM bank 1 (14B) is associated with each of the DRAM banks 12A and 12B respectively.

Data input to the memory device 10 is supplied on a data input bus 16 through an optional pre-input buffer 18 to an input multiplexer ("mux") 20, as shown. Data input on the data input bus 16 is ultimately maintained within an input buffer 22 at a location determined by the input multiplexer 20. The input buffer 22 is nominally an input buffer ("IB") number of words deep.

Data maintained within the input buffer 22 is alternately supplied to the SRAM caches 14A and 14B in accordance with a write pointer 24 and write multiplexer 26. The write pointer 24 and write multiplexer 26 are controlled by an input/output ("I/O") and control block 28. The I/O and control block 28 is bidirectionally coupled to a number of external inputs/outputs for the memory device 10 including, inter alia, a "full" output 30, an "empty" output 32, a master reset input 34, a write clock input 36 and a read clock input 38.

Data maintained within the SRAM caches 14A and 14B is supplied, respectively, to corresponding rows within the DRAM banks 12A and 12B in accordance with instructions from a refresh and maximum access time control block 40 as will be more fully described hereinafter. Data ultimately read from the DRAM banks 12A and 12B is supplied on a data output bus 50 through an optional pre-output buffer 48 in accordance with an I/O and control block 42, a read pointer 44 and read multiplexer 46. The I/O and control blocks 28 and 42 are bidirectionally coupled to the refresh and maximum access time control block 40, as well as to the input/output pins of the memory device 10.

As noted previously, FIFOs have typically been designed using only SRAM technology memory arrays because DRAM technology has been too slow and the delays (i.e. row access, precharge, refresh, maximum access time, etc.) have made any other implementation other than SRAM inadequate.

The EDRAM technology developed by Enhanced Memory Systems, Inc. serves to minimize delays associated with row access, precharge, and therefore refresh in DRAM arrays. The EDRAM architecture employs a small SRAM cache which allows reads to occur during refresh and precharge cycles of the DRAM array. Functionally, the SRAM cache and DRAM array are sufficiently decoupled so that writes can occur to the SRAM or DRAM or both and reads from the SRAM and writes to the DRAM can occur simultaneously.

These features provide the efficiency necessary to enable the design of a FIFO utilizing a DRAM primary memory in conjunction with an associated SRAM cache equal to the performance of those designed with solely SRAM technology. EDRAM technology allows for the manufacture of large FIFOs at a much lower cost than alternative technologies.

As shown in the preceding figure, the FIFO memory device 10 incorporates an input buffer 22 to allow writes to occur during refresh cycles, precharge cycles, row access cycles, and delays caused by the implementation of special features. A refresh counter, internal refresh timer or an external refresh pin may also be incorporated. In alternative embodiments, the FIFO memory device 10 may also incorporate: an internal clock that is some multiple of the system clock or other high frequency clock; a sleep mode (in order to ensure refreshes occur during quiescent state automatically); pre-input and pre-output buffers 18, 48 to relieve constraints imposed by simultaneous activity in the memory array 12 and the input buffer 22 and/or the output; an output or multiple output buffers to enhance FIFO memory device 10 performance or to allow for the implementation of special features; and maximum access time row registers and timers (one set for each DRAM bank 12A and 12B).

In the preferred embodiment illustrated, the FIFO memory device 10 has as a minimum an input bus 16, an output bus 50, a read clock 38, a write clock 36, and power ($V_{DD}$ or $V_{CC}$) and ground pins ($V_{SS}$, not shown). It is also desirable to have empty 32 and/or full 30 flags. Other flags and features could include programmable almost full ("PAF"), programmable almost empty ("PAE"), retransmit, and the like. In alternative embodiments, the EDRAM based FIFO memory device 10 might advantageously consist of a single bank of DRAM memory but the multiple bank (two or more DRAM banks 12A and 12B) architecture is desirable inasmuch as write row preparation in one bank can take place in parallel with writes to the other bank of the DRAM array 12.

With respect to the FIFO memory device 10, the SRAM banks 14A and 14B and DRAM banks 12A and 12B may be implemented as they are in the EDRAM disclosed in the aforementioned patent applications except that is advantageous to turn off the write-through mechanism at certain times. The inputs and outputs 16, 50 are word-wide. In the preferred embodiment illustrated, the FIFO memory device 10 memory is organized as Y rows by X columns and the columns are word-wide as well. For example, a 2 Megabit FIFO memory device 10 with 2Kbits per row and 16 bits I/O would comprise a memory array 12 with 1024 rows (512 in each bank 12A and 12B). Each row of the DRAM banks 12A and 12B would have 128 columns and, therefore, each SRAM bank 14A and 14B would be 2048 bits and 128 columns.

The organization of the FIFO memory device 10 memory is chosen to minimize control complexity and minimize overall die size. The memory may be mapped such that the even rows are in Bank 0 and the odd rows are in Bank 1. This may not be absolutely necessary but it serves to simplify the ensuing FIFO memory device 10 control description and may help ultimately minimize the control logic.

The input buffer 22 is preferably sized so that writes do not stall if the DRAM array banks 12A and 12B are blocked when a refresh, precharge, row access cycle, etc. is in progress. The input buffer 22 may be implemented in several ways (i.e. as a shift register, a latch with a multiplexer to reorder the data, etc.) but it is desirable that the data written from the latch to the memory is in the order the data is received. The input buffer 22 could also be effectively transparent as it is only required when writes are blocked by a DRAM bank 12A and 12B related activity (i.e. a refresh cycle, row access cycle, precharge cycle, etc.). Writes to the FIFO memory device 10 may occur directly to the memory (write-through) much the same way that the standard EDRAM functions. The latch need only be written when writes to the DRAM banks 12A and 12B are blocked.

The optional buffers on the input (18) and output (48) may be desirable in order to compensate for internal FIFO memory device 10 delays. This can occur if a write to the FIFO memory device 10 (Data In 16) and a write from the latch to the memory occur simultaneously. An output buffer can also be required when the read multiplexer 46 is being reset (see, for example the SRAM only logic flowchart of FIG. 8, more fully described hereinafter). In any case, these are single cycle delays and the internal bandwidth of the FIFO memory device 10 may ultimately be sufficient to make the pre-input and pre-output buffers 18, 48 unnecessary.

In order to effectively control the FIFO memory device 10 the following information is needed: the size and state of the input buffer 22; the state of all timers (i.e. has the refresh timer expired; the location of the read pointer 44 in the memory and relative to the write pointer 24; the location of the write pointer 24 in the memory and relative to the read pointer 44; the location of the next row in the DRAM banks 12A and 12B to be refreshed; the location of open rows that are reaching the maximum access time limit; the size of the memory (maximum address); the number of rows in the DRAM memory array; and the depth of the rows (the number of columns in each Bank).

With reference to the following figures and the description of a preferred embodiment, the following timers, counters, registers, and flags are defined to describe the operational flow control for the FIFO memory device 10, although other equivalent control mechanisms may be acceptable:

| Counters | | Description and Purpose |
|---|---|---|
| WP | Write Pointer 24 | Indicates the number of words written to the FIFO memory device 10. It also indicates the address of the next word to be written. The length is determined by the maximum address (i.e. if the FIFO is 1024 words deep WP is 10 bits). When the maximum value is reached it is reset to 0. |
| RP | Read Pointer 44 | This counter is analogous to WP except it indicates the number of words read and the address of the next word to be read. It is equal in length to WP and is also reset to 0 after it reaches the maximum value. |
| WRDC | WP RP Distance Cntr | Indicates the distance between the Read Pointer and the Write Pointer. When WRDC is 0 the FIFO memory device 10 is empty and when WRDC is equal to the maximum address the FIFO is full. WRDC can also be used for an almost full or almost empty output if desired. |
| IBC | Input Buffer Counter | Indicates the number of valid words in the input buffer |
| WRC | Write Row Counter | Indicates the row to which data is being written. It also indicates the bank that the write multiplexer 26 is in (i.e. when WRC is even the write mux is in Bank 0 and WRC is odd write mux is in Bank 1. Each time WMC is reset WRC is incremented. When WRC reaches the maximum number of rows it is reset to 0. |

|  |  | Description and Purpose |
|---|---|---|
| RRC | Read Row Counter | Analogous to WRC except that it indicates row from which data is being read and the bank the read multiplexer 26 is in. |
| WMC | Write Mux Counter | Points to the next column where data is to be written to the memory. When the value of WMC equals the number of columns in a row WMCF is set and WMC is reset to 0. |
| RMC | Read Mux Counter | Analogous to WMC except it indicates the position of the read multiplexer 26. When RMC equals the number of columns in a row RMCF is set and RMC is reset to 0. |
| RFC | Refresh Counter | Indicates the next row to be refreshed. It ticks every refresh cycle. The counter is equal in length WRC or RRC. When RFC reaches its maximum value it is reset to 0. |
| Timers | | |
| MATT (0) | Max Access Time Tmr | Timer (Bank 0) of sufficient granularity to signal the control logic that a precharge needs to be performed. When MATT reaches its preprogrammed value of MATF is set. |
| MATT (1) | Max Access Time Tmr | Timer (Bank 1) of sufficient granularity to signal the control logic that a precharge needs to be performed. When MATT reaches its preprogrammed value of MATF is set. |
| RFT | Refresh Timer | Timer of sufficient granularity to signal the control logic that a refresh needs to be performed. When RFT reaches its preprogrammed value RFF is set. |
| Flags | | |
| MATF (0) | Max Access Time Flag | Signals the control logic that a precharge must be performed in DRAM Bank 0 12A. |
| MATF (1) | Max Access Time Flag | Signals the control logic that a precharge must be performed in DRAM Bank 1 12B. |
| RFF | Refresh Flag | Signals the control logic that a refresh cycle needs to be performed. |
| MNRF (0) | Memory Not Ready | Signals the control logic that the DRAM array is not accessible in Bank 0 12A (i.e. a refresh, a bank access, or a precharge cycle is in progress) |
| MNRF (1) | Memory Not Ready | Signals the control logic that the DRAM array is not accessible in Bank 1 12B (i.e. a refresh, a bank access, or a precharge cycle is in progress). |
| WMCF | Write Mux Counter Flag | Indicates a page boundary for writes to the memory. |
| RMCF | Read Mux Counter Flag | Indicates a page boundary for reads from the memory. |
| Registers | | |
| WMCS | Write Mux Cntr SRAM | Temporary variable used to mark the location of the write multiplexer 26. |
| IB | Input Buffer | Size of the input buffer 22 in words (fixed value). |
| CN | Column Number | Number of columns in a row (fixed value). |

In order to more fully understand the operation of the FIFO memory device 10 it may be useful to generally describe the operation of an EDRAM device as disclosed in the aforementioned patent applications. The EDRAM integrated circuit memory device incorporates an SRAM cache embedded near the sense amplifiers of a DRAM array and there is one SRAM cell per sense amplifier. The result is an SRAM cache equal to the length of a row for each bank of DRAM. The typical operation of an EDRAM device is to load the SRAM cache on a read (i.e. all reads from the device are from the SRAM cache) and to write to the DRAM on a write (i.e. all writes to the device are to the DRAM array). If the read and write are to the same row (i.e. a cache "hit" to the last row read) both the SRAM cache and DRAM array are written (i.e., a write-through). Precharge and refresh cycles may be done in parallel with reads from the SRAM.

Figure 2:
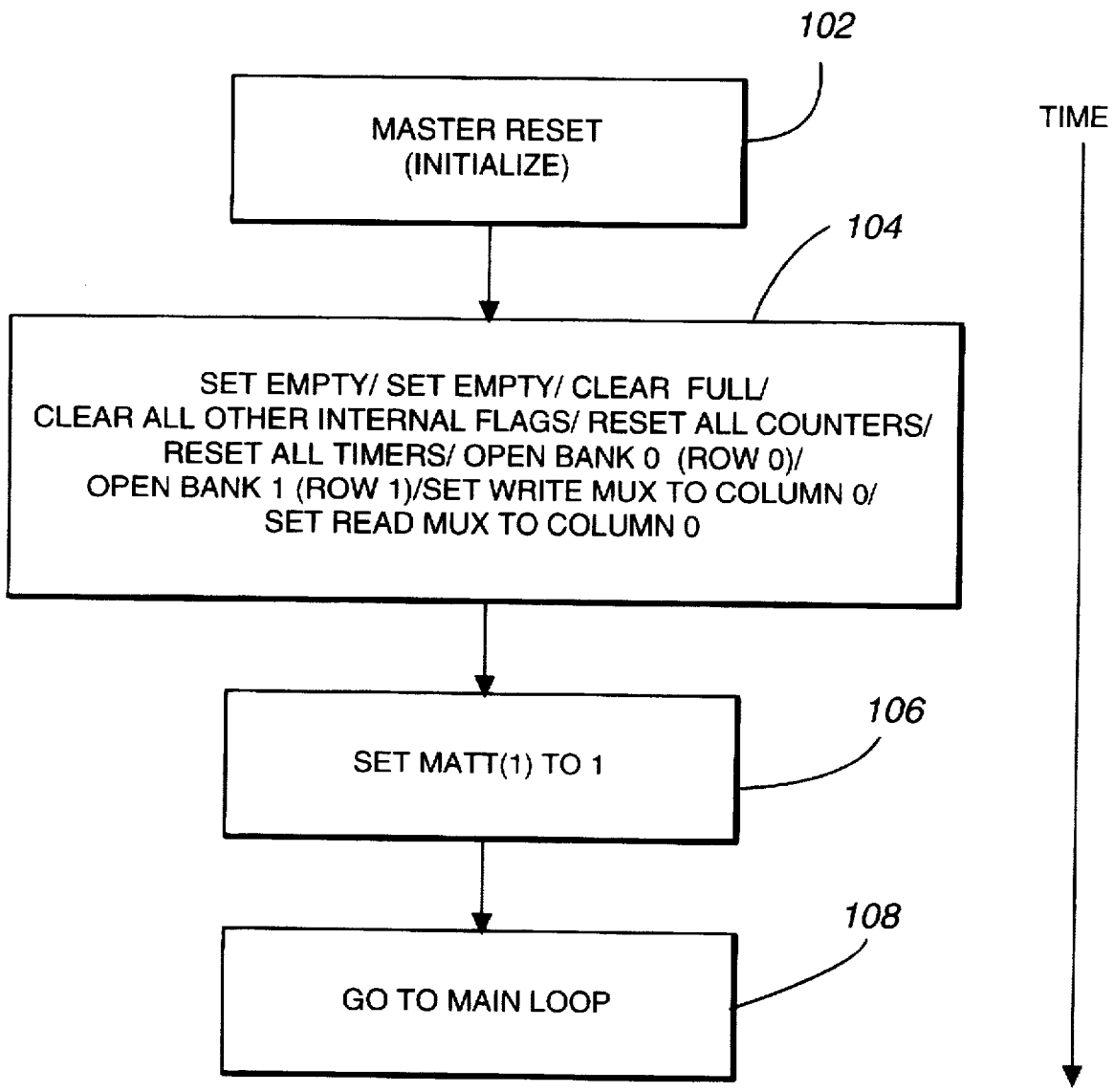
FIG. 2 is a logic flowchart beginning with the initialization of the representative device of FIG. 1 useful in understanding the control procedure for a FIFO memory device in accordance with the present invention.

With reference additionally now to FIG. 2, a logic flow chart for an exemplary control procedure for the functional operation of the memory device 10 of FIG. 1 is shown. The process 100 begins with a master reset step 102 which serves to initialize the memory device 10 by application of an appropriate signal to the master reset input 34 (FIG. 1). At step 104, the empty flag is set and the full flag is cleared. In addition, all other internal flags are cleared and all counters of the memory device 10 are reset. Still further, all memory device 10 timers are reset and DRAM bank 0 (12A) and DRAM bank 1 (12B) are opened (rows 0 and 1 respectively). At this point, the write multiplexer 26 is set to column 0 and the read multiplexer 46 is also set to column 0. Thereafter, at step 106, the maximum access time timer ("MATT(1)") is set to a value of 1 and the process 100 proceeds to step 108 to enter the logic flow main loop as will be discussed more fully hereinafter with respect to FIG. 3.

As previously described, following a master reset, or upon power up, all memory device 10 counters and timers are set to their proper state. The device empty pin 32 (output) is set to indicate there is no valid data in the FIFO memory device 10. The full pin 30 (output) is cleared to indicate there is room in the FIFO memory device 10 for more data. Thereupon, rows 0 and 1 (banks 0 and 1 of the DRAM array) are opened and prepared to read or write; the internal data path is set to write both the SRAM banks 14A and 14B and DRAM banks 12A and 12B and all timers are enabled and incrementing.

Figure 3A:
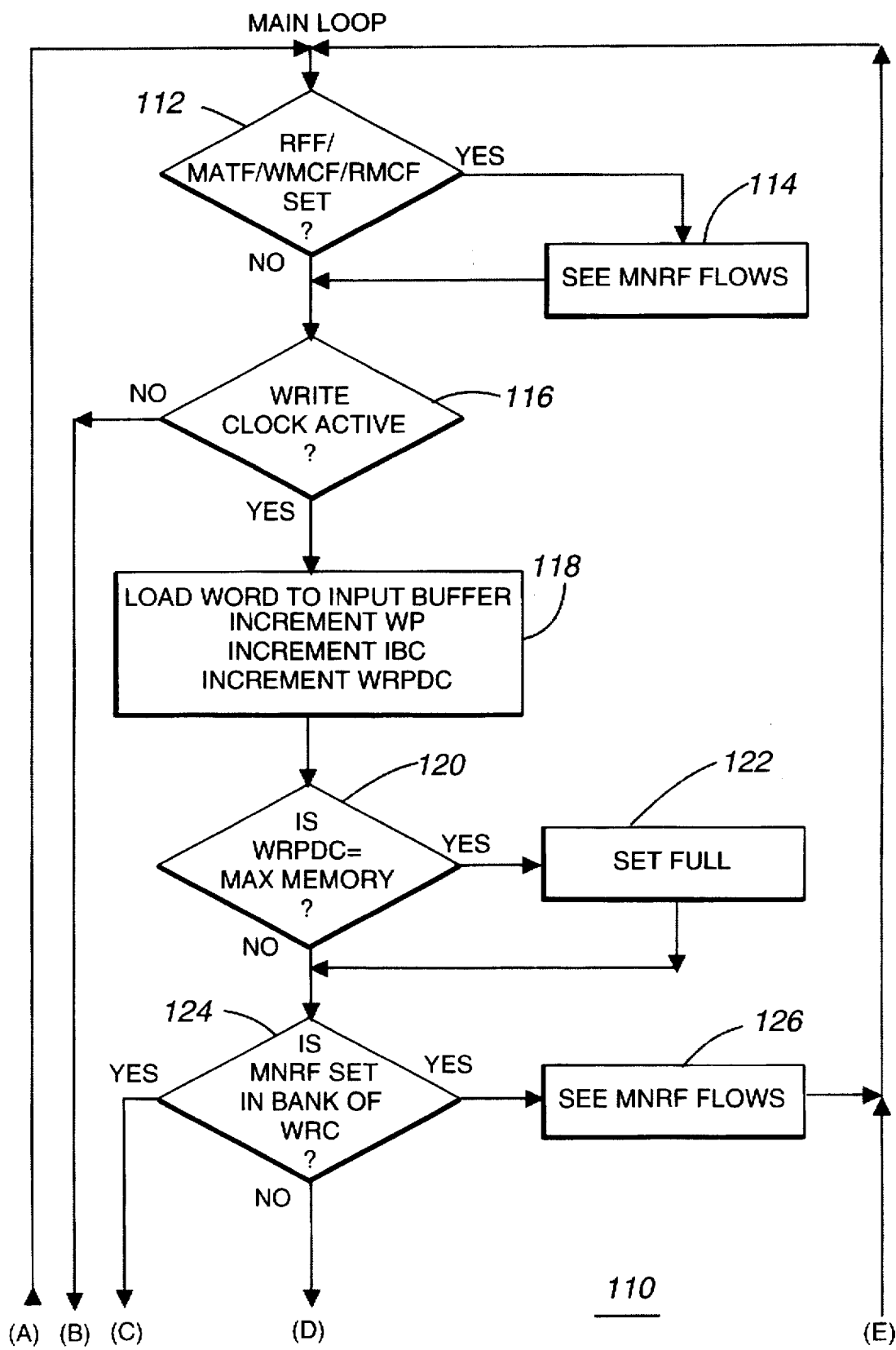
FIG. 3 consisting of FIGS. 3A and 3B is a further, more detailed, logic flowchart illustrating the main control loop depicted in the flowchart of FIG. 2.
Figure 3B:
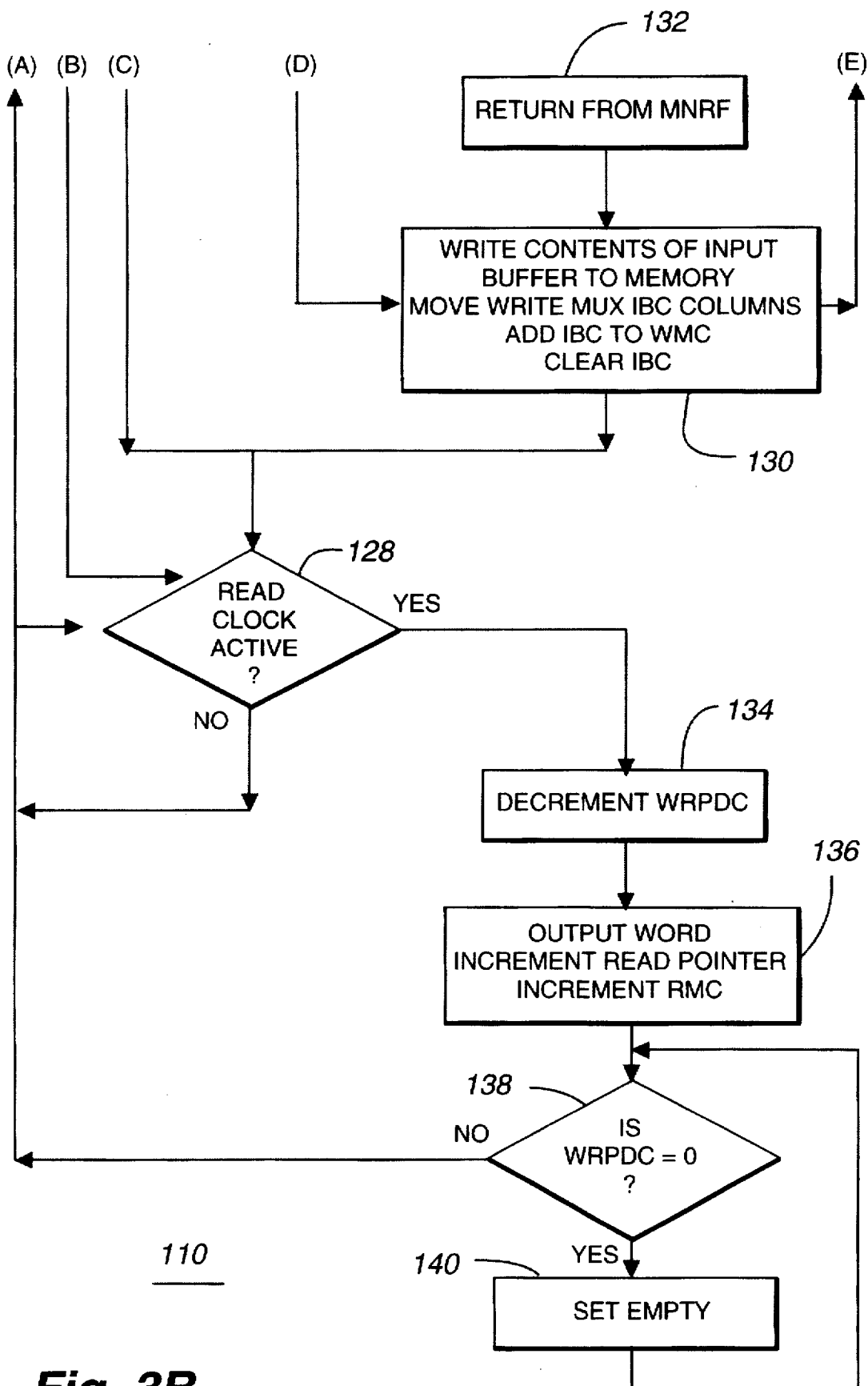

With reference additionally now to FIG. 3, the main loop process 110 is shown. The main loop process 110 begins with decision step 112 (wherein it is determined if the refresh flag ("RFF"), the maximum access time flags ("MATF"), the write multiplexer counter flag ("WMCF") and read multiplexer counter flags ("RMCF") are set.) If all of these flags are set, then the main loop process 110 proceeds to the various memory not ready ("MNRF") process flows 114 shown in various of the succeeding figures. On the other hand, if all of the aforementioned flags tested in the decision step 112 are not set, then, at decision step 116, it is determined if the write clock 36 is active. If the write clock 36 is active, then the process 110 proceeds to step 118 where a word is loaded to the input buffer 22, the write pointer ("WP") 24 is incremented, and the input buffer counter ("IBC") is also incremented. In addition, the write pointer distance counter ("WPDC") is incremented. Alternatively, if at decision step 116, the write clock 36 is not active, then the process 110 proceeds to step 128, as will be more fully described hereinafter.

Following step 118 at decision step 120, the write pointer distance counter is tested to see if it is at the maximum capacity of the memory. If it is, then the full flag is set at step 122 and the process 110 proceeds to decision step 124. Alternatively, if the write pointer distance counter is not at the maximum amount of memory, then the process 110 proceeds directly to decision step 124.

At decision step 124, the memory not ready flag is tested to see if it is set in the bank of the write row counter ("WRC"). If the MNRF is set, then the process proceeds to step 126, which will be more fully described hereinafter, followed by a return to initial decision step 112. Concurrently, the process flow proceeds to decision step 128 to determine if the read clock is active. If at decision step 124, the MNRF is not set in the bank of the write row counter, then at step 130, the contents of the input buffer 22 are written to the memory device 10 memory. At this point, it should be noted that this write operation will occur to either the DRAM banks 0 or 1 (12A or 12B), the SRAM caches 14A or 14B only or to both depending on the relative position of the write pointer 24 and the read pointer 44, as will be more fully described hereinafter with respect to the MNRF process flows.

Following step 130, the process 110 returns to the initial decision step 112 and the read clock 38 is tested at decision step 128. The step 130 also includes returns from the MNRF flows at step 132, as will be more fully described hereinafter. At decision step 128, if the read clock 38 is active, then the write and read pointer distance counters are decremented at step 134 and, at step 136, the data word is output, the read pointer 44 is incremented and the read multiplex counter ("RMC") is incremented. However, if at decision step 128 the read clock 38 is not active, then the process 110 enters a loop to test the state of the read clock and the process 110 returns to initial decision step 112. Following step 136, the WRPDC is tested to see if it is equal to 0 at decision step 138 and if it is, the empty flag is set at step 140. Alternatively, if at decision step 138 the WRPDC is not equal to 0, then the process 110 returns to initial step 112 and to test the state of the read clock 38 at decision step 128.

In operation, the process 110 begins with the memory device 10 control logic verifying that some action dealing with the DRAM array is not required (see MNRF Flow) and waits for a read or write clock active indication. If the write clock 36 becomes active, a word is written to the input buffer 22 and the write pointer (WP), the write read distance counter (WRPDC) and the input buffer counter (IBC) are incremented. If WRPDC is equal to the size of the memory in words the full pin 30 is set. If the memory is not ready (i.e., the memory not ready flag is set) the memory device 10 returns to the top of the process 110 loop and continues to write data to the input buffer 22 until MNRF is cleared. If MNRF is clear (i.e., MNRF cycles return) in the bank of the write mux 46, then the contents the input buffer 22 (the number of valid words in the input buffer is equal to IBC) is written to the memory (if IBC is 0, nothing is written to the memory). The input buffer 22 is now empty and IBC is cleared. The write mux 46 (or write column decoder) moves to the location where the next word will be written (from the input buffer 22 to the memory). The memory device 10 then returns to wait for an active read clock 38, an active write clock 36 or a flag indicating that some action dealing with the DRAM array banks 12A and 12B is required.

Read operations occur on active read clocks 38. On a read clock active cycle, a word is output (from the SRAM banks 14A and 14B to the Data Out bus 50), WRDC is decremented, and if WRDC is 0, the empty pin 32 is set and the memory device 10 again waits for an active read or write clock (38, 36) or flag.

Figure 4:
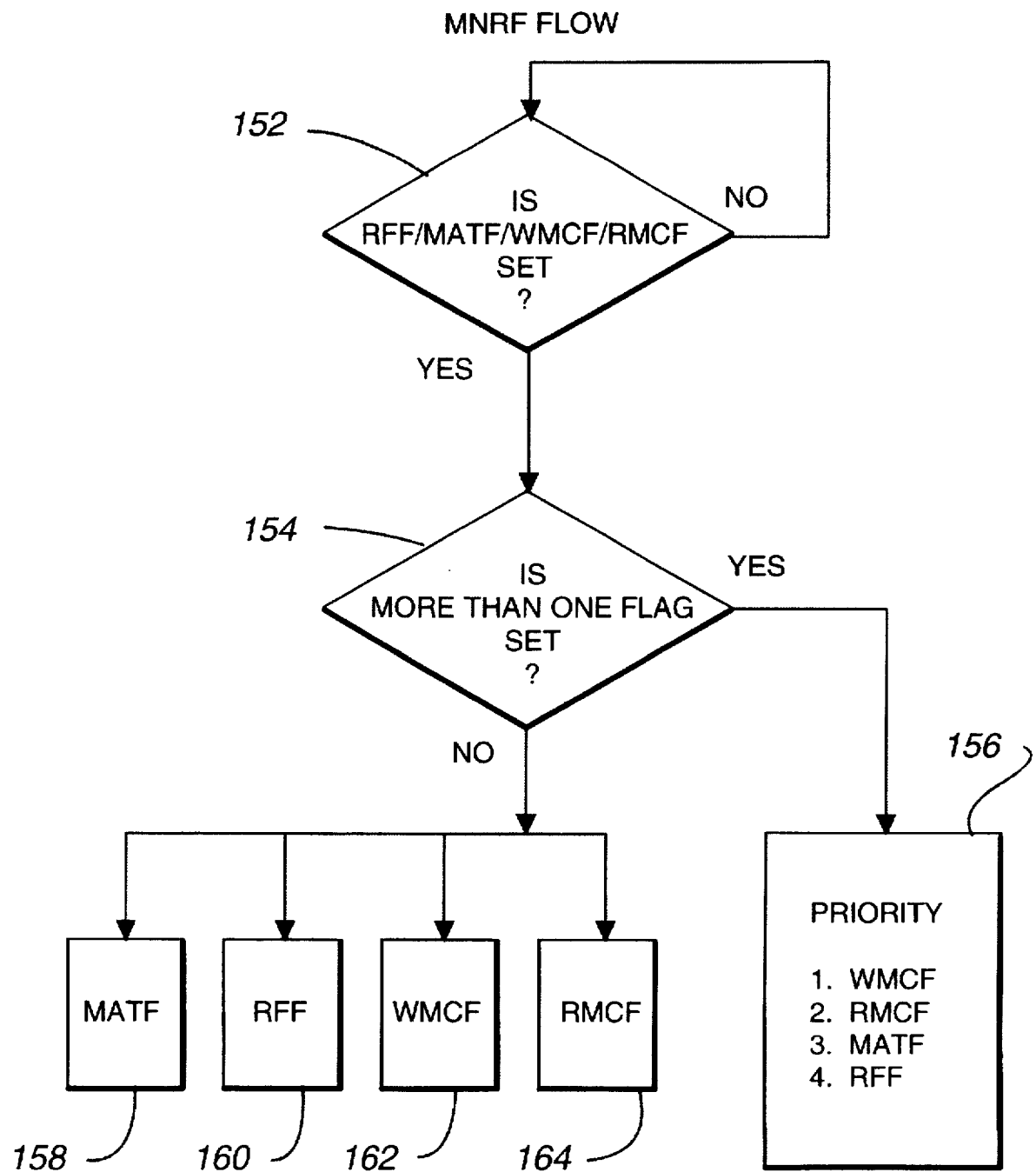
FIG. 4 is a further, more detailed, logic flowchart illustrating the "memory not ready" ("MNRF") flow illustrated in the flowchart of FIG. 3.

With reference additionally now to FIG. 4, the initial process 150 for the various MNRF flow sequences is shown. The process 150 begins at decision step 152 where the state of the flags RFF/MTF/WMCF/RMCF are tested to see if they are set. Thereafter, at decision step 154, if more than one of the aforementioned flags is set, then the process 150 proceeds to step 156 to accord priority to the various flags as indicated. However, if at decision step 154, only one of the aforementioned flags in decision step 152 is set, then the process proceeds to the appropriate one of steps 158 ("MATF"), 160 ("RFF"), 162 ("WMCF") or 164 ("RMCF").

Functionally, the flow 150 is initiated when any of the flags signaling an event associated with the memory array is set. If one or more flags are set, a priority is established for the purpose of deciding the order in which the requests are serviced. The priority may vary from that described and shown as necessary if there is some benefit to the particular implementation.

Figure 5:
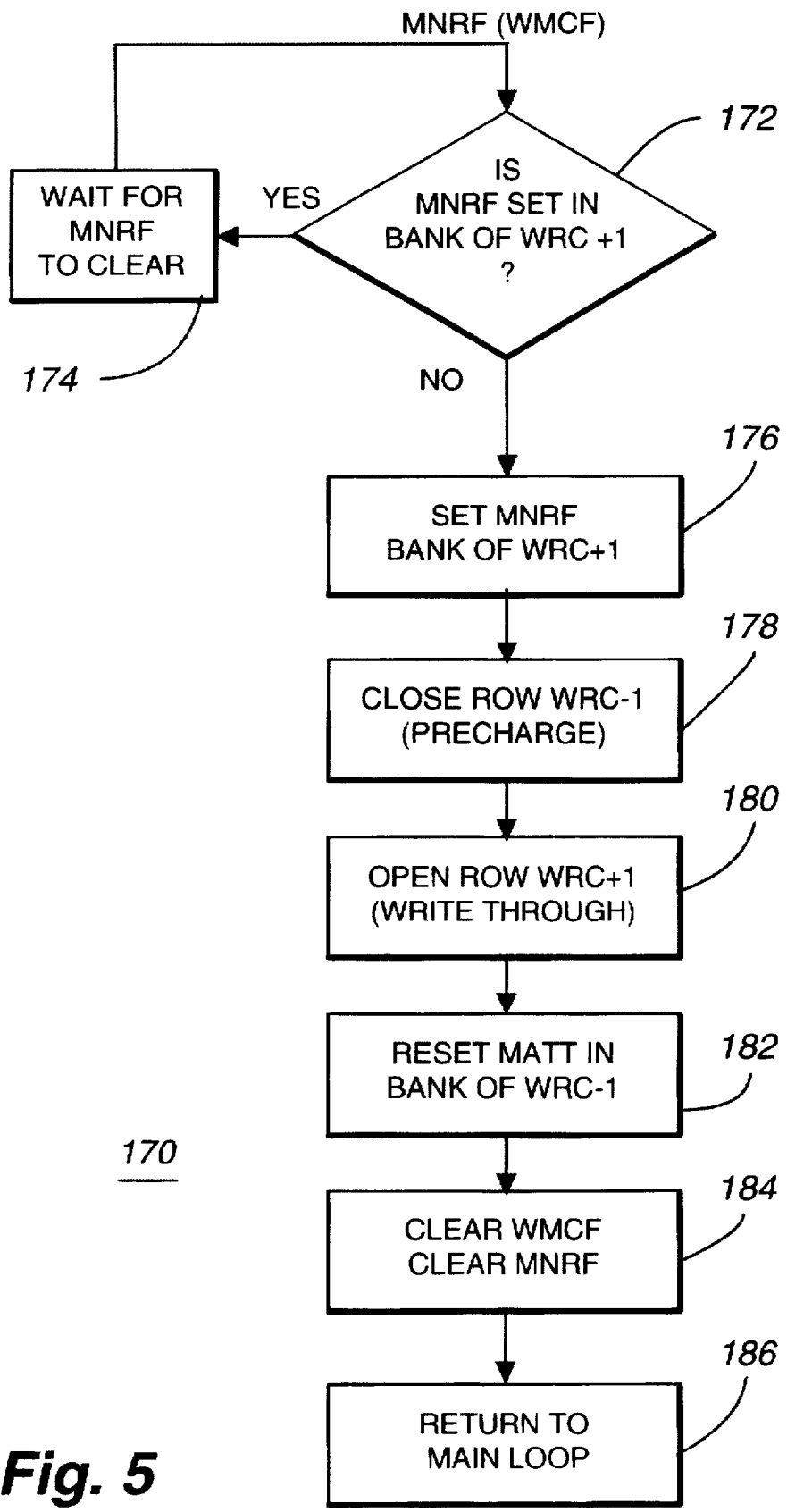
FIG. 5 is a further, more detailed, logic flowchart illustrating the MNRF write multiplexer ("mux") counter flag ("WMCF") flow referenced in the preceding FIG. 4.

With reference additionally now to FIG. 5, the MNRF process flow 170 corresponding to step 162 of FIG. 4 is shown. The process flow 170 begins at decision step 172 to determine if MNRF is set in the bank of the write row counter plus 1. If the MNRF is set, then at step 174, a wait is entered for the MNRF to clear. Alternatively, if the MNRF is not set, then at step 176, MNRF is set in the bank of the write row counter plus 1. Thereafter, at step 178, the write row counter minus 1 is closed to allow for a precharge operation to occur. At step 180, the write row counter plus 1 is opened to allow for a write through operation. At step 182, the maximum access time timer in the bank of the write row counter minus 1 is reset at step 182. Thereafter at step 184, the WMCF and MNRF are cleared. At step 186, the process flow 170 returns to the main loop.

In operation, the process 170 cycle prepares the memory for writes in the bank ahead of the write multiplexer 26. The write mux counter (WMC) tracks the position of the write multiplexer 26. The write mux counter is reset (set to 0) after it reaches the number equal to the number of columns in a row. Each time WMC is set to 0, the write row counter (WRC) is incremented and the write mux counter flag (WMCF) is set indicating the write multiplexer 26 has crossed a bank boundary. When WMCF is set, the memory device 10 checks for other memory related activity (MNRF is set in the bank ahead of WRC). If MNRF is set in that bank (i.e. if WRC is odd the status of MNRF(0) is needed), the memory device 10 waits for MNRF to clear. When the memory is ready, MNRF is set to prevent other memory activities from interfering and a precharge is performed on the row in the previous bank. The next row is then opened and set to write to the DRAM array only. The maximum access time timer is then reset in the bank ahead of WRC and MNRF and WMCF are cleared and control returns to the Main Loop shown in FIG. 3.

Figure 6:
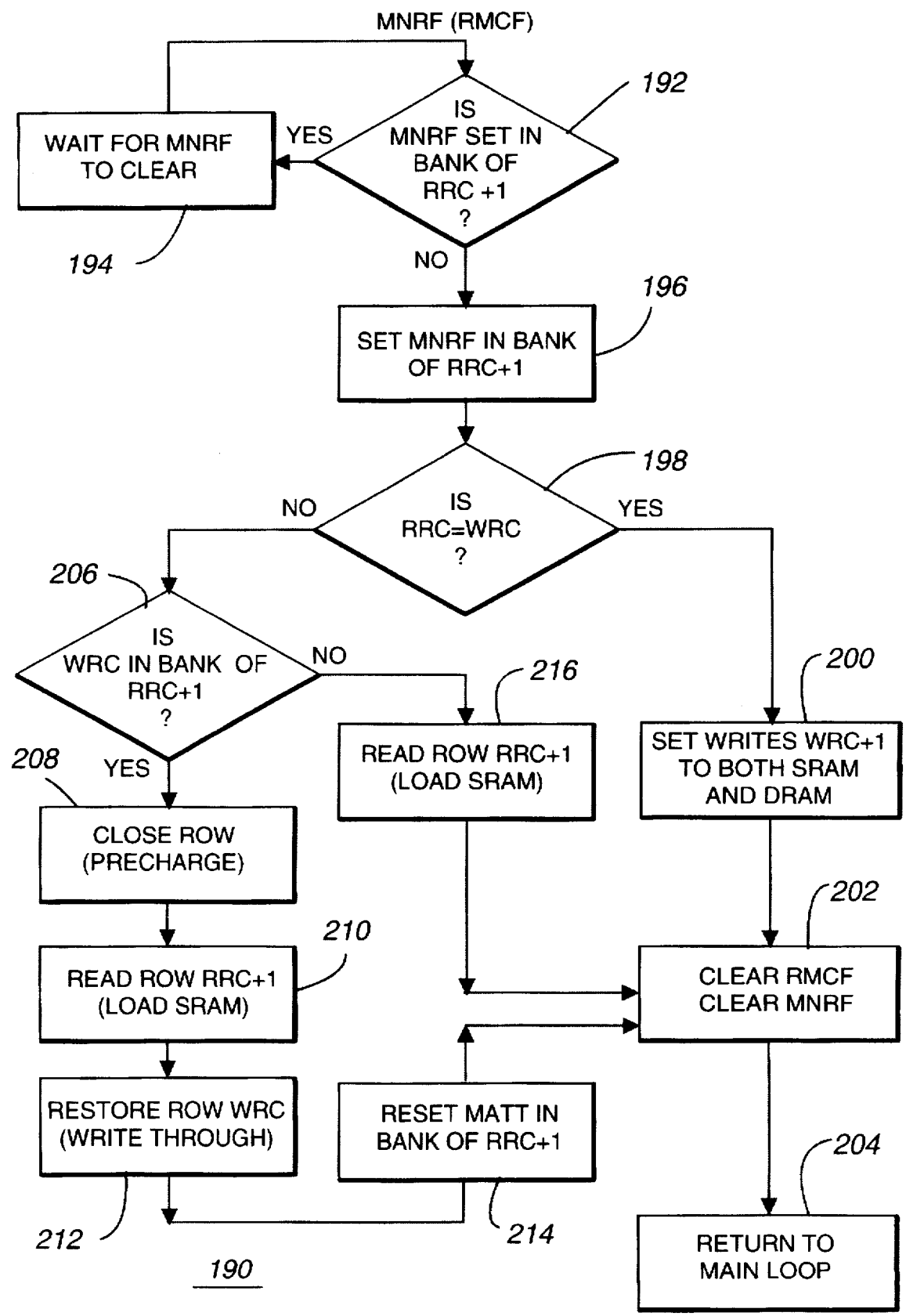
FIG. 6 is a further, more detailed, logic flowchart illustrating the MNRF read mux counter flag ("RMCF") flow referenced in the preceding FIG. 4.

With reference additionally now to FIG. 6, a process flow 190 corresponding to the step 164 of FIG. 4 is shown. The process flow 190 begins at decision step 192 to determine if the MNRF is set in the bank of the read row counter plus 1. If MNRF is set, then at step 194, a wait is entered for that to clear. Alternatively, if MNRF is not set, then it is set at step 196 in the bank of the read row counter plus 1. Thereafter, at decision step 198, a determination is made as to whether the read row counter is equal to the write row counter. If it is, then at step 200, writes to the write row counter plus 1 are made to both the appropriate one of the SRAM 14A or 14B and the DRAM 12A or 12B. At step 202, the RMCF and MNRF are cleared and the process 190 returns to the main loop at step 204.

Alternatively, if RRC is not equal to WRC, then at decision step 206, a determination is made as to whether the write row counter is in the bank of the read row counter plus 1. Thereafter, if the write row counter is in the bank of the read row counter plus 1, then at step 208, that row is closed to allow for a precharge operation and, at step 210, the row RRC plus 1 is read and loaded into the SRAM. At step 212, the WRC row is restored to allow for a write through and the maximum access time timer in the bank of the read row counter plus 1 is reset at step 214 prior to entry of step 202 as previously described. Alternatively, if at decision step 206 the read row counter is not in the bank of the write row counter plus 1, then at step 216 row RRC plus 1 is read to load the SRAM and the process 190 proceeds to step 202.

Functionally the process 190 cycle prepares the memory for a read operation in the bank ahead of the read multiplexer 46. The read mux counter (RMC) tracks the position of the read multiplexer 46 and is reset after it reaches the number equal to the number of columns in a row. Each time RMC is set, the read row counter flag (RMCF) is set indicating the read multiplexer 46 has crossed a page boundary and RRC is incremented indicating the read multiplexer 46 is in the next row. When RMCF is set, the memory device 10 checks for other memory related activity (MNRF is set in the bank ahead of RRC). If MNRF is set in that bank (i.e. if RRC is odd the status of MNRF(0) is needed) the memory device 10 waits for MNRF to clear. When the memory is ready, MNRF is set to prevent other memory activities from interfering. If WMC and RMC (RMD=WMC) are the same row, the row ahead (WRC+1) is set to write both the appropriate ones of the SRAM banks 14A and 14B and DRAM banks 12A and 12B. MNRF and RMCF are then cleared and control returns to the main loop of FIG. 3. If the read and write multiplexer 46, 26 are not in the same row and the write multiplexer 26 is in the bank of RRC+1, the row (WRC) is precharged, RRC+1 is loaded into the SRAM, the row equal to WRC is restored, MATT for that bank is reset and control returns to the main loop.

Figure 7A:
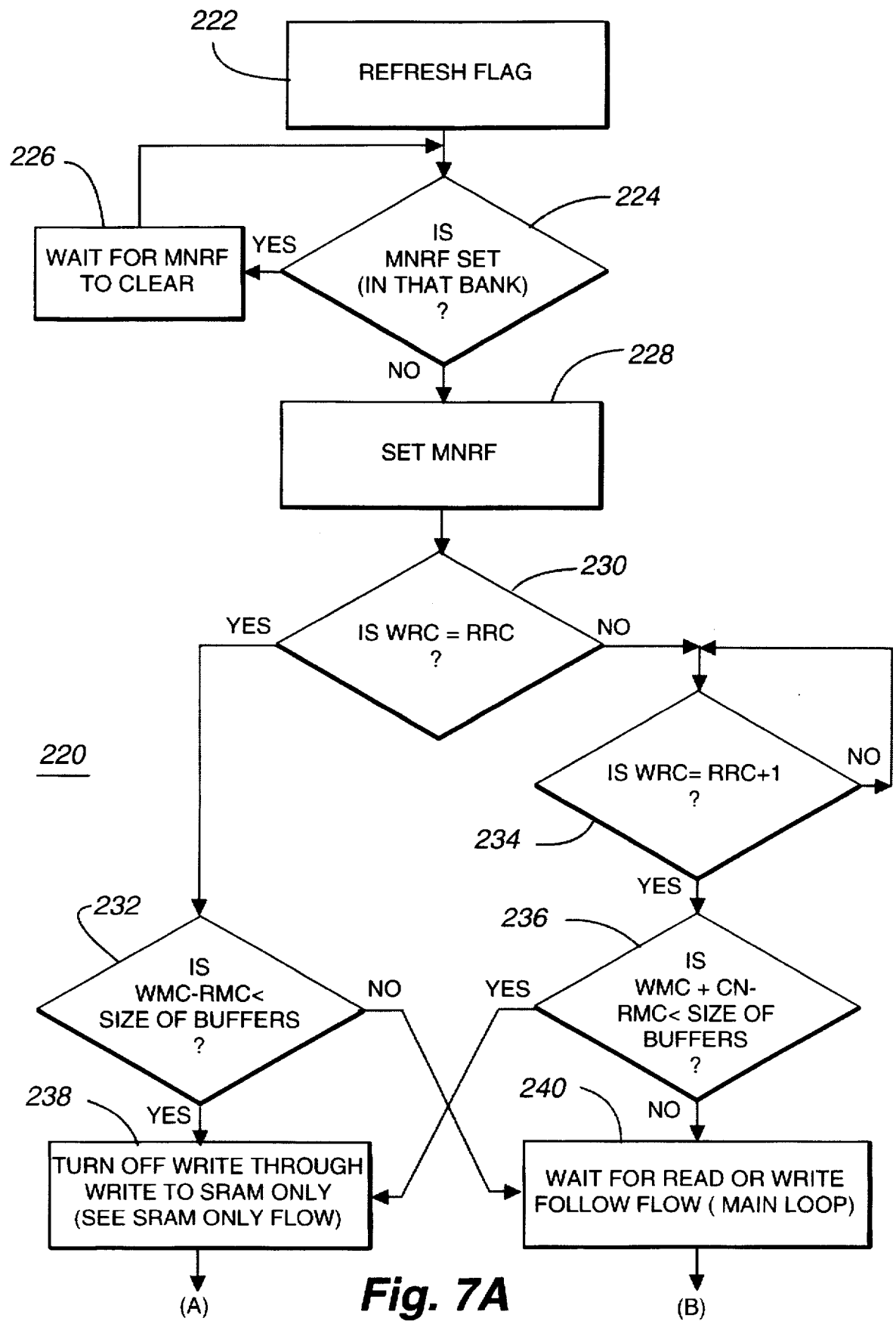
FIG. 7 consisting of FIGS. 7A and 7B is a further, more detailed, logic flowchart illustrating the MNRF refresh flag ("RFF") flow referenced in the preceding FIG. 4.
Figure 7B:
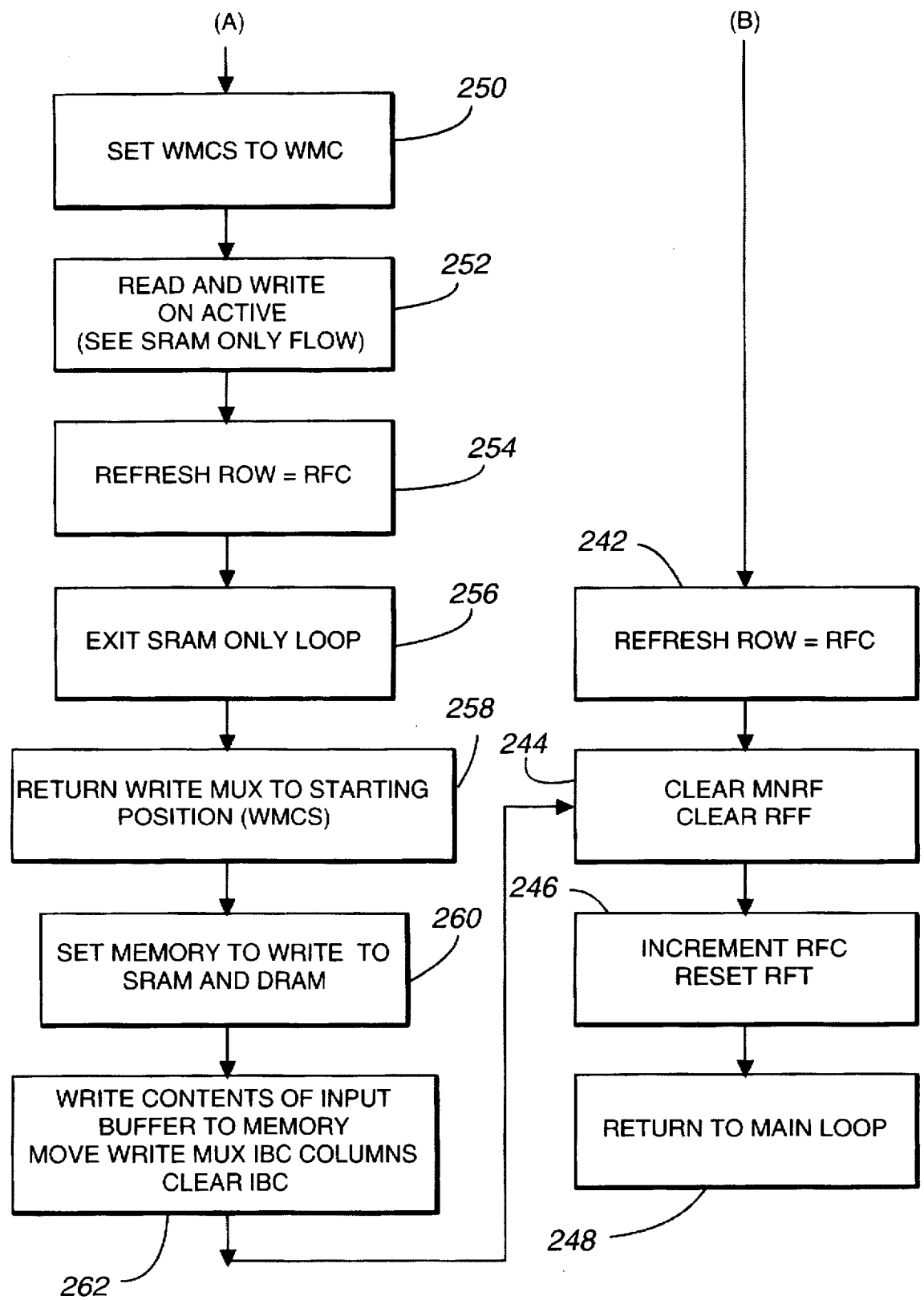

With reference additionally now to FIG. 7, a process flow 220 corresponding to step 160 of FIG. 4 is shown. The process flow 220 begins at step 222 to set the refresh flag. At decision step 224, a determination is made as to whether MNRF is set in that particular bank. If it is, then a wait is entered at step 226 which returns to step 224 until it is not set. If at decision step 224 MNRF is not set, then the process flow 220 proceeds to step 228 to set MNRF and then proceeds to decision step 230 to determine whether the write row counter is equal to the read row counter. If the write row counter is equal to the read row counter, then the process proceeds to decision step 232 to determine if the write multiplexer counter minus the read multiplexer counter is less than the size of the buffers. Alternatively, if at decision step 230 the write read counter is not equal to the row read counter, then at decision step 234 a determination is made as to whether the write row counter is set equal to the read row counter plus 1. Thereafter at step 236, if the write multiplexer counter plus CN minus the read multiplexer counter is less than the size of the buffers, then the process 220 proceeds to step 238 to turn off write-through operations and write only to either the SRAM banks 14A or 14B as described in the SRAM only flow of FIG. 8, to be more fully described hereinafter.

On the other hand, if at decision step 236, WMC plus CN minus RMC is not less than the size of the buffers, then at step 240, a wait is entered for either a read or write operation and the main loop flow 110 of FIG. 3 is followed. At step 242, the refresh row is set equal to the refresh counter and at step 244 the MNRF and RFF flags are cleared. Thereafter at step 246, the refresh counter is incremented and the refresh timer is reset. A return to the main loop flow 110 is executed at step 248. With reference to step 238, at step 250, WMCS is set to WMC and at step 252 a read and write on active is implemented as described in the SRAM only flow of FIG. 8 as will be more fully described hereinafter. At step 254, the refresh row is set equal to the refresh counter and at step 256, the SRAM only loop is exited at step 256. Thereafter, at step 258, the write multiplexer 26 is returned to its starting position (WMCS) and at step 260 the memory is set to write to the appropriate ones of both the SRAM banks 14A or 14B, as well as the DRAM banks 12A or 12B. The process flow 220 concludes with step 262 where the contents of the input buffer 22 are written to the memory and the write multiplexer input buffer counter columns are moved and the input buffer counter columns are cleared. Thereafter, the process flow 220 returns to step 244 as previously described.

In operation, the refresh flag is set when the refresh timer signals that a refresh is required. The refresh timer has sufficient granularity to allow a refresh cycle to be delayed if some other activity associated with the memory is in progress or a higher priority activity is pending. For example, if the refresh interval is 64 µS, the refresh flag is set some number of ticks before 64 µS has elapsed sufficient to complete all activities in progress or pending. When RFF is set, the memory device 10 waits for MNRF to clear (if set), determines that no other memory related activities are pending and sets MNRF in the bank of the refresh counter (RFC). A test is then done to determine if there is ample space in the input buffer 22 to allow reads and writes to occur without stalling at the maximum read clock 38 and write clock 36 frequency. If there is ample space, the appropriate MNRF is set, writes are to the input buffer 22 and reads are from the SRAM banks 14A and 14B as per the Main Loop. A refresh cycle is then completed, the refresh counter is incremented (next row to be refreshed), the refresh timer is reset and MNRF and RFF are cleared. At this point, control returns to the main loop flow 110 of FIG. 3.

If there is not a sufficient distance between the read and write multiplexers 46, 26 the write path to the DRAM banks 12A and 12B is disabled but the write path to the SRAM banks 14A and 14B remains enabled. The position of the write multiplexer 26 is then saved (WMCS) and control is now as described in the SRAM Only Flow of FIG. 8. The writes to the memory device 10 are now to the input buffer 22 and the SRAM banks 14A and 14B and the flow is similar to that in the main loop except that the input buffer counter (IBC) is not cleared. When the refresh cycle completes, the write multiplexer 26 is reset to the starting position (WMCS), the write path for the SRAM banks 14A and 14B and DRAM banks 12A and 12B is restored and the contents of the input buffer 22 are written to memory, the refresh timer is reset and the refresh counter is incremented and control returns to the main loop. It should be noted that a refresh cycle is the longest delay for which the memory device 10 cannot be written. Therefore the size chosen for the input buffer 22 may be predicated on the refresh delay at the maximum read or write clock 38, 36. When a refresh cycle is activated, writes to the DRAM banks 12A and 12B must be disabled.

Refresh operations also place constraints on the minimum number of columns in a row. WMCF and RMCF cycles must complete before the read or write multiplexers 46, 26 reach the end of a row. If, for example, a refresh cycle started an instant before RMCF and WMCF were set there could conceivably be a delay of up to 200 nS–300 nS. Since the read and write clocks 38, 36 can continue at the maximum specified clock frequency, the minimum number of columns is set equal to the maximum delay divided by the clock period.

Figure 8:
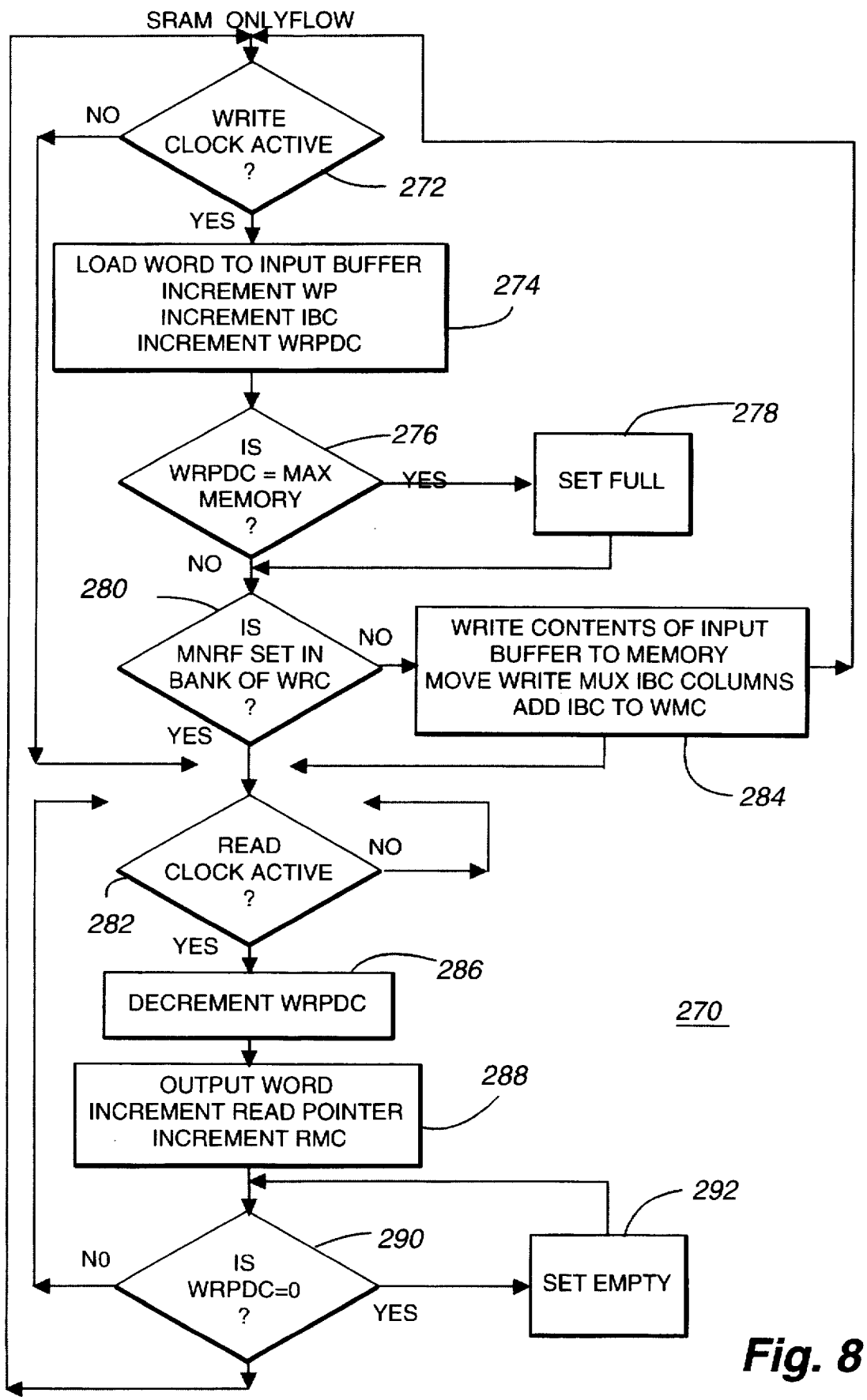
FIG. 8 is a further, more detailed, logic flowchart illustrating the SRAM only flow.

With reference additionally now to FIG. 8, the SRAM only process flow 270 previously alluded to is shown. The process flow 270 begins at decision step 272 to determine if the write clock is active. If it is, then the process flow 270 proceeds to step 274 to load the word to the input buffer 22, increment the write pointer 26, increment the input buffer counter, and increment WRPDC. Thereafter, at decision step 276, a determination is made as to whether the WRPDC is equal to the maximum memory. If it is, then the full flag is set at step 278 and the process 270 proceeds to decision step 280 to determine if MNRF is set in the bank of the write row counter. Alternatively, if at decision step 276 WRPDC is not equal to the maximum memory, then the process also proceeds to decision step 280.

If MNRF is set in the bank of the write row counter, then at decision step 282, a determination is made as to whether the read clock 38 is active. Alternatively, if MNRF is not set in the bank of the write row counter, then the contents of the input buffer 22 are written to memory (SRAM banks 0 and 1 (14A or 14B)) only, the write multiplexer 26 is moved an input buffer count number of columns and the input buffer counter is added to the write multiplexer counter. The process flow 270 then returns to decision step 272.

If at decision step 282, the read clock 38 is active, then the process flow 270 proceeds to step 286 to decrement WRPDC. At step 288, the word is output, the read pointer 44 is incremented, and the read multiplexer counter is incremented. At decision step 290, WRPDC is tested to see if it is equal to 0. If it is, then at step 292, the empty flag is set and the process returns to decision step 290. If at decision step 290 WRPDC is not equal to 0, then the process flow returns to step 272 to determine if the write clock 36 is active. As shown, if at decision step 272, the write clock 36 is not active, then the process flow 270 proceeds to decision step 282 to determine if the read clock 38 is active. If the read clock 38 is not active, then a loop is entered at decision step 282 until a positive result is obtained. At decision step 292, if WRPDC is not equal to 0, then the read clock 38 is again tested to see if it is active at step 282.

Figure 9A:
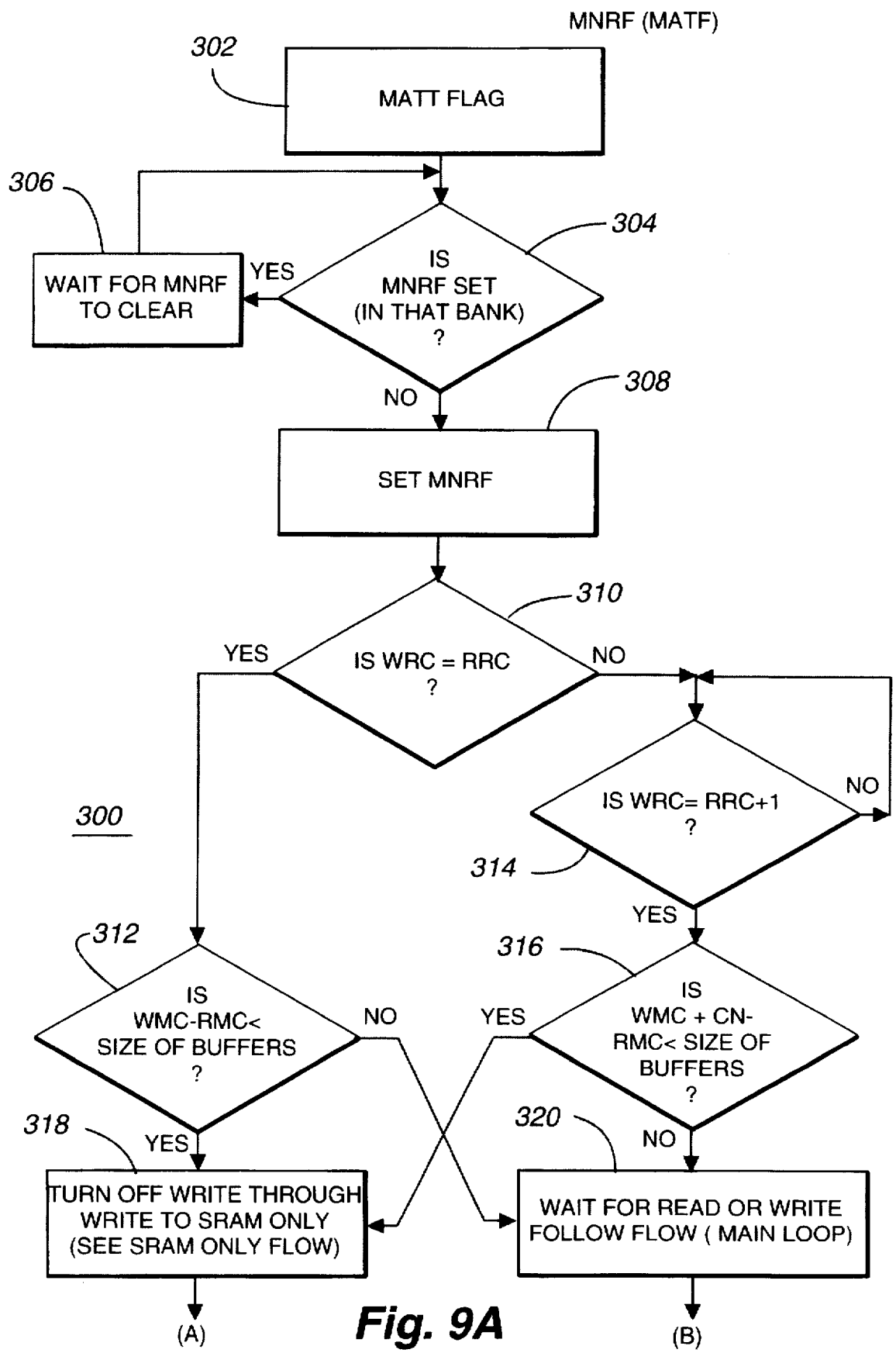
FIG. 9 consisting of FIGS. 9A and 9B is a further, more detailed, logic flowchart illustrating the MNRF maximum ("max") access time flag ("MATF") flow referenced in the preceding FIG. 4.
Figure 9B:
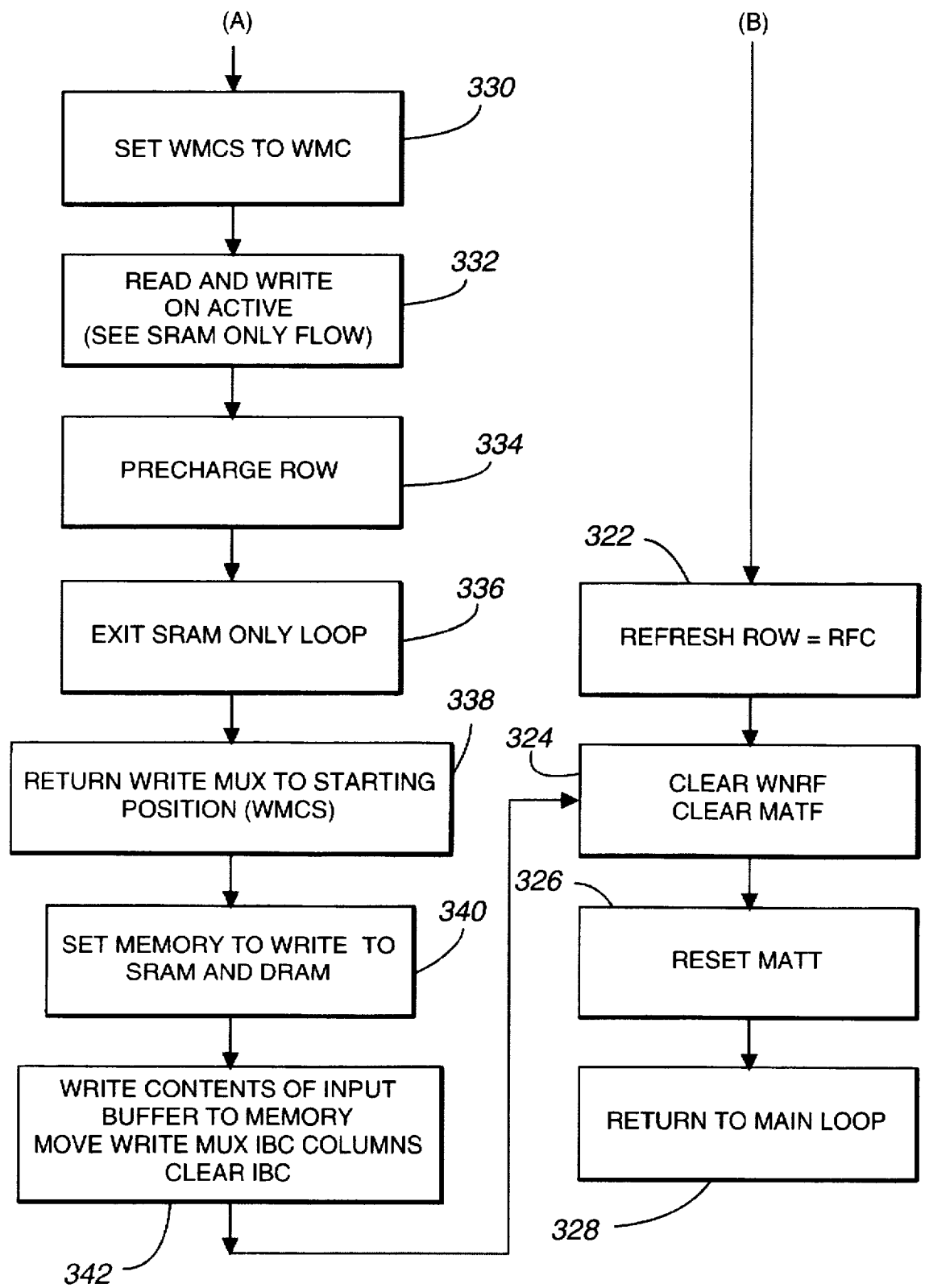

With reference additionally now to FIG. 9, a MNRF process flow 300 corresponding to step 158 of FIG. 4 is shown. At step 302, the maximum access time timer flag is tested and as decision step 304, a determination is made as to whether the MNRF is set in that particular bank of the memory. If MNRF is set, then at step 306, a wait is entered for MNRF to clear. If at decision step 304 MNRF is not set, then it is set at step 308 and the process flow 300 proceeds to step 310 to test whether the write row counter is set equal to the read row counter. If WRC equals RRC then the process flow 300 proceeds to decision step 312 where it is determined whether WMC minus RMC is less than the size of the buffers. Alternatively, if WRC is not equal to RRC at decision step 310, then the process flow 300 proceeds to decision step 314 where a determination is made as to whether WRC is equal to RRC plus 1. If at decision step 316 WMC plus NC minus RMC is less than the size of the buffers, then the process flow 300 proceeds to step 318 to turn off write-through operations and write to the SRAM banks 14A and 14B only, as described in the preceding FIG. 8. Alternatively, the process flow proceeds from either decision step 312 or decision step 316 to step 320 to execute a wait for a read or write operation and the main loop process flow 110 of FIG. 3 is followed.

Following step 320, at step 322, the refresh row is set equal to RFC and at step 324 MNRF is cleared and MATF is also cleared. At this point, at step 326, the max access time timer is reset and a return to the main loop of FIG. 3 is executed at step 328.

From step 318, the process flow 300 proceeds to step 330 to set WMCS to WMC. Thereafter at step 332, the read and write operations on active takes place in accordance with the SRAM only flow of FIG. 8 previously described. At step 334, the appropriate row is precharged and the SRAM only flow 270 loop is exited at step 336. At this point, the write multiplexer 26 is returned to the starting position (WMCS) at step 338 and the memory is set to write to the SRAM banks 14A or 14B and the DRAM banks 12A or 12B. At step 342, the contents of the input buffer 22 are written to memory and the write multiplexer input buffer counter columns are moved and the input buffer 22 is cleared, whereupon the process 300 returns to step 324.

In operation, the maximum access time limits are caused by sense amplifier decay. If a row in the DRAM array banks 12A and 12B is not precharged within the appropriate time limit, data will be lost. In some applications the process flow 300 may not be absolutely necessary but is described and shown for sake of completeness. The two bank FIFO memory device 10 shown here is designed to eliminate the need for maximum access time detection and control by making the refresh interval less than ½ of the maximum access time interval. This serves to ensure that every open row is precharged within the prescribed limit. If maximum access time detection and control is necessary, the flow may be designed similarly to the flow for refresh operations except that the row reaching the time limit only requires a precharge cycle.

What has been provided, therefore, is an integrated circuit FIFO memory device comprises an input bus for receiving data, an input buffer coupled to the input bus for storing the data and at least one DRAM array coupled to the input buffer. A write pointer is operative for storing the data in the input buffer to a location within the memory array indicated and an output bus is coupled to the memory array and a read pointer for providing previously written data from the memory array at a location indicated by the read pointer. In a preferred embodiment, the FIFO further comprises at least one SRAM cache interposed between the input and output buses and the memory array having a width corresponding to each row of the memory array.

While there have been described above the principles of the present invention in conjunction with specific device architecture, it is to be clearly understood that the foregoing description is made only by way of example and not as a limitation to the scope of the invention. While the exemplary memory device disclosed represents an asynchronous device, in a synchronous implementation the read and write clocks may be replaced with read and write enables instead. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. An integrated circuit first-in, first-out memory device comprising:

an input bus for receiving data to be written to said memory device;

an input buffer coupled to said input bus for storing said data;

a dynamic random access memory array comprising a plurality of memory banks coupled to said input buffer and a write pointer for storing said data in said input buffer to a location within said memory array indicated by said write pointer;

a plurality of memory caches each of said memory caches corresponding to one of said plurality of memory banks;

an output bus coupled to said memory array, said plurality of memory caches and a read pointer for providing previously written data from said memory array to a corresponding one of said plurality of memory caches at a location indicated by said read pointer.

2. The memory device of claim 1 wherein said memory caches have a width corresponding to that of said memory banks.

3. The memory device of claim 1 further comprising a pre-output buffer interposed between said memory array and said output bus.

4. The memory device of claim 1 further comprising a refresh and maximum access time control circuit for determining a time to refresh selected rows in said memory array.

5. The memory device of claim 1 wherein said write pointer indicates a number of words of data written to said memory device.

6. The memory device of claim 5 wherein said write pointer further indicates an address of a next one of said words of data to be written to said memory device.

7. The memory device of claim 1 wherein said read pointer indicates a number of words of data read from said memory device.

8. The memory device of claim 7 wherein said read pointer further indicates an address of a next one said words of data to be read from said memory device.

9. The memory device of claim 1 further comprising a write row counter for indicating a row of said memory array to which data is to be written.

10. The memory device of claim 9 further comprising a refresh counter corresponding in length to said write row counter for indicating each refresh cycle of said memory array.

11. The memory device of claim 1 further comprising a write row counter for indicating which of said plurality of memory banks is to be written.

12. The memory device of claim 1 further comprising a read row counter for indicating a row of said memory array from which data is to be read.

13. The memory device of claim 12 further comprising a refresh counter corresponding in length to said read row counter for indicating each refresh cycle of said memory array.

14. The memory device of claim 1 further comprising a read row counter for indicating which of said plurality of memory banks is to be read.

15. The integrated circuit first-in, first-out memory device of claim 1 wherein more than one of said plurality of memory banks of said memory array may be opened concurrently.

16. The integrated circuit first-in, first-out memory device of claim 1 wherein more than one of said plurality of memory banks of said memory array are opened concurrently upon initialization of said device.

17. A method for accessing a first-in, first-out memory device including a dynamic random access memory array and an associated static random access memory cache, said method comprising the steps of:

determining a next write location within said memory array to which input data is to be written;

writing said input data to said next write location within said memory array;

further determining a next read location within said memory array from which previously written data is to be read;

loading said previously written data from said memory array to said memory cache;

reading said previously written data from said memory cache; and refreshing portions of said memory array during said step of reading.

18. The method of claim 17 further comprising the steps of:

providing an input buffer associated with said memory array and said memory cache;

holding said input data in said input buffer if said memory array is currently inaccessible.

19. The method of claim 17 further comprising the step of:

refreshing portions of said memory array during said step of reading.

20. The method of claim 17 further comprising the step of:

precharging bit lines of portions of said memory array during said step of reading.

21. The method of claim 17 further comprising the step of:

also writing said input data to said memory cache if said previously written data from said memory array in said memory cache corresponds to said next write location within said memory array to which said input data is to be written.

22. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and an input multiplexer coupling said input bus to said input buffer.

23. The memory device of claim 22 further comprising a pre-input buffer coupling said input bus to said input multiplexer.

24. The memory device of claim 22 wherein said at least one dynamic random access memory array comprises first and second memory array banks and further comprising first and second static random access memory caches interposed between said input and output buses and said first and second memory array banks, each of said first and second static random access memory caches having a width corresponding to that of each of said first and second memory array banks.

25. The memory device of claim 24 further comprising first and second maximum access time timers for indicating to said memory device that a precharge operation must be performed to a corresponding one of said first and second memory array banks respectively.

26. The memory device of claim 24 further comprising first and second memory not ready indicators for indicating to said memory device that a corresponding one of said first and second memory array banks is not currently accessible.

27. The memory device of claim 24 wherein said first and second memory array banks are alternatively mapped with rows of said data.

28. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and a write multiplexer counter for indicating a next column in said memory array to which data is to be written.

29. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and a read multiplexer counter for indicating a next column in said memory array from which data is to be read.

30. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and a maximum access time timer for indicating to said memory device that a precharge operation must be performed to said memory array.

31. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and a refresh timer for indicating to said memory device that a refresh operation must be performed to said memory array.

32. An integrated circuit first-in, first-out memory device comprising:

an input bus for receiving data to be written to said memory device;

an input buffer coupled to said input bus for storing said data;

at least one dynamic random access memory array coupled to said input buffer and a write pointer for storing said data in said input buffer to a location within said memory array indicated by said write pointer;

an output bus coupled to said memory array and a read pointer for providing previously written data from said memory array at a location indicated by said read pointer; and a memory not ready indicator for indicating to said memory device that said memory array is not currently accessible.

33. A method for accessing a first-in, first-out memory device including a dynamic random access memory array and an associated static random access memory cache, said method comprising the steps of:

determining a next write location within said memory array to which input data is to be written;

writing said input data to said next write location within said memory array;

further determining a next read location within said memory array from which previously written data is to be read;

loading said previously written data from said memory array to said memory cache;

reading said previously written data from said memory cache; and precharging bit lines of portions of said memory array during said step of reading.

34. The method of claim 33 further comprising the steps of:

providing an input buffer associated with said memory array and said memory cache; and holding said input data in said input buffer if said memory array is currently inaccessible.

35. A method for accessing a first-in, first-out memory device including a dynamic random access memory array and an associated static random access memory cache, said method comprising the steps of:

determining a next write location within said memory array to which input data is to be written;

writing said input data to said next write location within said memory array;

further determining a next read location with in said memory array from which previously written data is to be read;

loading said previously written data from said memory array to said memory cache;

reading said previously written data from said memory cache; and also writing said input data to said memory cache if said previously written data from said memory array in said memory cache corresponds to said next write location within said memory array to which said input data is to be written.

36. The method of claim 35 further comprising the steps of:

providing an input buffer associated with said memory array and said memory cache; and holding said input data in said input buffer if said memory array is currently inaccessible.

* * * * *